United States Patent [19]
Phillips et al.

[11] Patent Number: 5,628,057
[45] Date of Patent: May 6, 1997

[54] MULTI-PORT RADIO FREQUENCY SIGNAL TRANSFORMATION NETWORK

[75] Inventors: James P. Phillips, Lake in the Hills; Eric L. Krenz, Crystal Lake, both of Ill.

[73] Assignee: Motorola, Inc., Schaumburg, Ill.

[21] Appl. No.: 611,268

[22] Filed: Mar. 5, 1996

[51] Int. Cl.$^6$ .................. H04B 1/38; H01P 5/10
[52] U.S. Cl. .................. 455/89; 333/5; 333/127; 333/128; 333/26; 343/859; 455/129
[58] Field of Search .................. 333/5, 127, 128, 333/26; 343/859, 865; 455/89, 129

[56] References Cited

U.S. PATENT DOCUMENTS

| | | | |
|---|---|---|---|
| 2,570,579 | 10/1951 | Masters | 333/5 |
| 2,606,964 | 8/1952 | Gluyas, Jr. | 333/26 |
| 3,827,001 | 7/1974 | Laughlin | 333/127 |
| 4,032,850 | 6/1977 | Hill | 455/326 |
| 4,647,868 | 3/1987 | Mueller | 330/286 |
| 4,686,536 | 8/1987 | Allcock | 343/700 MS |
| 4,725,792 | 2/1988 | Lampe, Jr. | 333/128 |
| 4,800,393 | 1/1989 | Edward et al. | 343/821 |
| 4,916,410 | 4/1990 | Littlefield | 330/295 |
| 5,025,232 | 6/1991 | Pavio | 333/26 |
| 5,091,732 | 2/1992 | Mileski et al. | 343/797 |

*Primary Examiner*—Paul Gensler
*Attorney, Agent, or Firm*—Daniel W. Juffernbruch

[57] ABSTRACT

A transformation network is provided capable of interfacing between an unbalanced port (110) and a plurality of differently phased balanced ports (120, 130). A balun (165) has a choke (140) and connects the unbalanced port (110) to a balanced pair of nodes. An additional node (145) is provided on the balun. First and second unbalanced phase shift transmission lines (150, 155) have a common ground conductor connected to the additional node (145) of the balun (165). A phase-shifted balanced port (130) is thus provided by center conductors of these first and second unbalanced phase shift transmission lines (150, 155) when the other ends of these transmission lines are coupled to the balanced nodes of the balun (165) and the common ground conductor of these transmission lines is connected to the additional node (145) of the balun.

19 Claims, 6 Drawing Sheets

MULTI-PORT RADIO FREQUENCY SIGNAL TRANSFORMATION NETWORK

BACKGROUND OF THE INVENTION

1. Technical Field of the Invention

The present invention relates to signal transformation networks and, more particularly, relates to passive multi-port radio frequency signal transformation networks that adjust phase and amplitude balance on the lines.

2. Description of the Related Art

A number of radio communication systems, most notably mobile and portable satellite systems, require small circularly polarized antennas on the subscriber unit. These small circularly polarized antennas, such as orthogonally polarized dipole antennas, square or circular microstrip patch antennas or twisted crossed loop antennas require a 90° phase shift between two excited modes of the antenna. Most of these antennas, such as the orthogonally polarized dipole antennas and the twisted crossed loop antennas, are also inherently balanced structures that require a balun (balanced-unbalanced network) for a balanced feed. The balun transforms an unbalanced transmission system from a radio transceiver to a balanced feed system for the antenna. Most external baluns and phase shifters/power dividers known in the art are prohibitively bulky and introduce excess signal loss.

Self-phasing versions of some of these circularly polarized antennas can be used to generate circularly polarized radiation without an external phase shifter. This is done by slightly shifting the resonant frequencies of the two modes away from the nominal frequency in opposite directions, so that the reactive components of the modes'input impedances cause appropriately phased currents to result from a single applied voltage source. A nearly square patch antenna probe-fed along a diagonal is an example of this sort of structure, as is the twisted crossed loop antenna with a difference in lengths between the loops. The self-phased antenna, however, is typically frequency bandwidth limited more than an externally phased antenna (non-self phased antenna). The self-phasing of the self-phased antenna limits the bandwidth more than any other features, such as, for example, impedance match features and pattern features, would limit the bandwidth of an antenna. An externally phased antenna leaves more degrees of freedom than a self-phased antenna to accomplish other antenna performance goals, such as a better antenna pattern. A better antenna pattern achieves better gain over a range of angles allowing a mobile or portable satellite transceiver to have better omnidirectional performance.

Improvements are needed for externally phasing a non-self-phased antenna. Both the function of providing a balanced-unbalanced network and providing a phase shifting network are required external to a non-self-phased antenna. A compact, high performance and low cost network is desired for providing phase shift and converting between a balanced and unbalanced line. More compact portable satellite transceivers can thereby be made available in the consumer market.

The constructions and features of the present invention will become more apparent from the following detailed description when read in conjunction with the accompanying drawings.

DETAILED DESCRIPTION OF THE PREFERRED EMBODIMENTS

Figure 1:
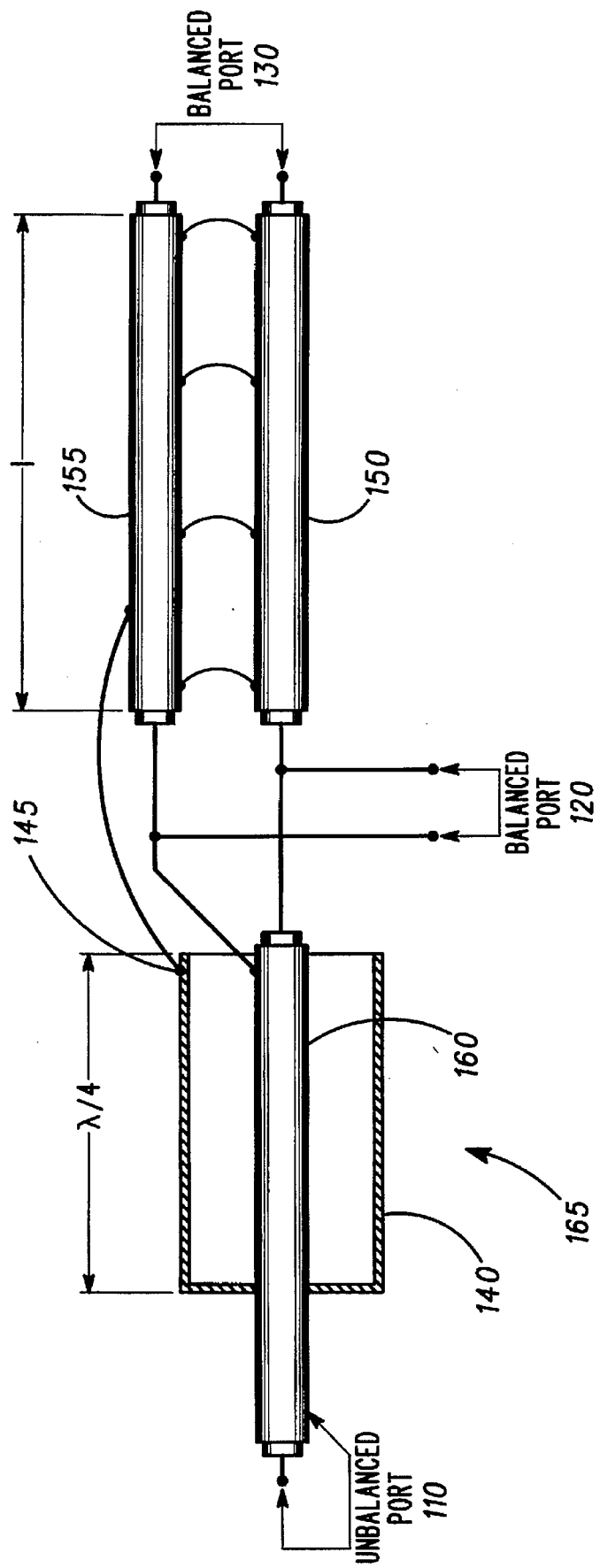
FIG. 1 illustrates a schematic diagram of an electrical equivalent circuit of the transformation network.

FIG. 1 illustrates an electrical equivalent of a transformation network providing a power divider, a quadrature phase-shift network and a balun in a single, compact structure. An unbalanced signal applied to an unbalanced port 110 will be split on an equal-power basis between two balanced ports 120 and 130. The resultant signal component at the balanced port 130 will have a 90° phase shift relative to the resultant signal component at the balanced port 120. Appropriately phased quadrature signals applied to balanced ports 120 and 130 will be combined by the transformation network with nominally no attenuation and output an unbalanced signal at the unbalanced port 110.

The transformation network utilizes a choke 140 at the unbalanced port 110 and two unbalanced phase shift transmission lines 150 and 155 at the phase-shifted balanced port 130. The choke 140 and an unbalanced feed line 160 provide a balun (balanced-unbalanced network) for connection to the two unbalanced phase shift transmission lines 150 and 155. In the example of FIG. 1, the choke 140 preferably has a length of one-quarter the wavelength (λ/4) of a frequency of interest. This quarter-wave choke could have a length of any odd multiple of one-quarter wavelength (¼, ¾, 5/4, etc.). An open ended choke could alternatively be used for all even harmonics (½, 1,3/2, etc.).

The two phase shift transmission lines 150 and 155 at the phase-shifted balanced port 130 have a length 1 dependent upon a desired amount of phase shift at the phase shifted balanced port 130. The inventors have discovered that the two phase shift transmission lines 150 and 155 provide a phase shifted and balanced output at the balanced port 130 when a signal conductor of each of the two transmission lines 150 and 155 connect to the two outputs of the balun 165 and a ground of the two transmission lines 150 and 155 connects to an additional node 145 of the balun. The additional node 145 of the balun provides a differential reference for the balanced output port of the balun 165. This differential reference provided by the additional node 145 of the balun is connected to the ground conductors of the two unbalanced transmission lines 150 and 155. Although a 90° phase shift is provided by the phase shifted balanced port 130 to feed a quadrature antenna, for example, any desired phase shift can be provided on any number of outputs. Two or more pairs of phase shift transmission lines can be used to provide three or more balanced ports. The balanced port 120 having a 0° phase shift preferably connects directly without use of any phase shift transmission lines. Pairs of phase shift transmission lines could accordingly be provided at each of the unbalanced ports.

The quarter-wave choke 140 could be of the illustrated coaxial type, or could be of a stripline type. Further, the choke 140 could alternatively be a quarter-wave choke of a coaxial, stripline or triplate type. The phase shifts are accomplished by delaying the signals as they propagate through the transmission lines. Thus, the phase shifts are created by phase delays.

When the additional node 145 of the balun is connected to the ground conductors of the two unbalanced phase shift transmission lines 150 and 155, the additional node 145 of the balun becomes a differential reference node for the differently phase balanced ports 120 and 130 and the center conductors of the two unbalanced phase shift transmission lines 150 and 155 form the two signal conductors of the phase shifted balanced port 130.

Figure 2:
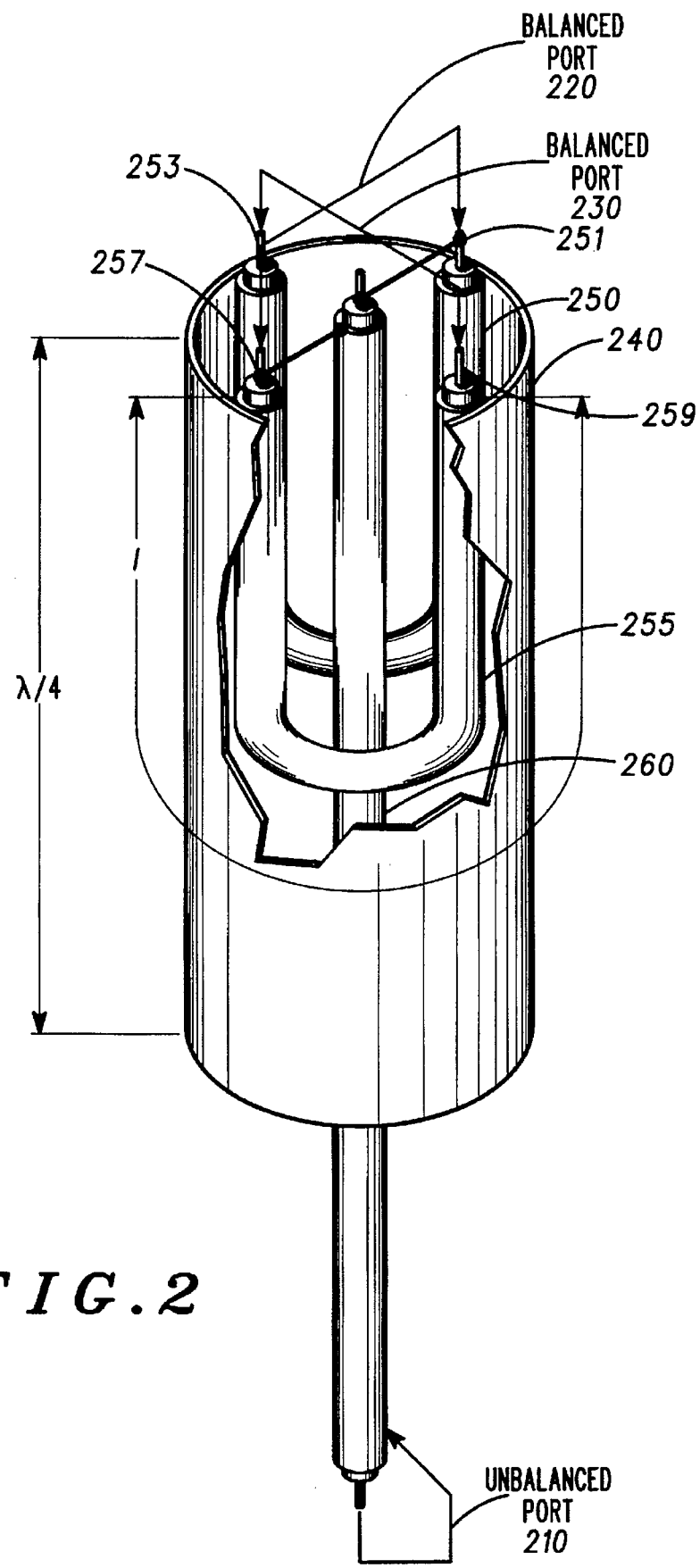
FIG. 2 illustrates a perspective view of a coaxial implementation according to a first embodiment of the transformation network.

FIG. 2 illustrates a perspective view of a coaxial implementation according to a first embodiment of the transformation network. An exemplary 50 Ohm coaxial unbalanced feed line 260 connects an unbalanced port 210 to one of the balanced ports 220. The one balanced port 220 is created by a quarter-wave choke formed by sleeve 240 coaxial with the feed line 260. This configuration of the quarter-wave choke 240 and the unbalanced feed lines 260 forms a type of balun known as a bazooka balun. The sleeve 240 is preferably an air-filled choke.

Two U-shaped links of 50 Ohm coaxial cables form balanced phase shift transmission lines 250 and 255. The U-shaped phase shift balanced transmission lines 250 and 255 are preferably disposed inside the sleeve 240 soldered to an inside surface of the sleeve 240. The U-shaped phase shift transmission lines 250 and 255 in an alternative construction can be mounted by soldering to an outside surface of the sleeve 240. When the U-shaped phase shift transmission lines 250 and 255 are located on the inner surface instead of the outer surface of the sleeve 240, the overall diameter of the structure would be smaller and the effective bandwidth of the bazooka balun slightly reduced. These equal length 1 coaxial phase shift transmission lines 250 and 255 have an electrical length of one-quarter wave to provide a phase shift of 90° at the phase shifted balance port 230. These phase shift transmission 250 and 255 preferably are made of a readily available 50 Ohm coaxial cable while the unbalanced feed line 260 is preferably made of a 50 Ohm coaxial cable. The center conductors of 251 and 257 at one end of each of the phase shift transmission lines 250 and 255 are connected to the center conductor and outer conductor of the feed line 260. The center conductors 253 and 259 at the other ends of each of the phase shift transmission lines 250 and 255 together form the phase shifted balance port 230. The center conductor and shield of the unbalanced feed line 260 form the 0° phase shifted balanced port 220. Both of the ports 220 and 230 are balanced as guaranteed by the open-circuit impedance at the end of the sleeve 240. The sleeve 240 also acts to isolate the outer conductive shields of phase shift transmission lines 250 and 255 from both the unbalanced feed line 260 and the antenna or other balanced system to be connected to the balanced ports 220 and 230. The sleeve 240 performs three functions: the sleeve serves as a bazooka balun, the sleeve isolates the phase shift transmission lines 220 and 230 from the rest of the circuitry and the sleeve functions as an additional node providing a reference to connect to the outer conductors of the phase shift transmission lines 250 and 255. No transmission network has heretofore been possible having a simple single construction and providing both a balun and phase shift network in one simple construction.

The 50 Ohm phase shifted transmission lines 250 and 255 with their shields connected theretogether form a 100 Ohm balanced transmission line with the same velocity of propagation as the 50 Ohm lines. This is because the distributed inductance is doubled (twice the magnetic energy is stored per unit length for the same current) while the distributed capacitance is halved (two units of the original capacitance are placed in series for each unit length). The characteristic impedance doubles and the phase velocity remains unchanged. The resultant electrical characteristic impedances at each of the balanced ports 220 and 230 are 100 Ohms.

Figure 3:
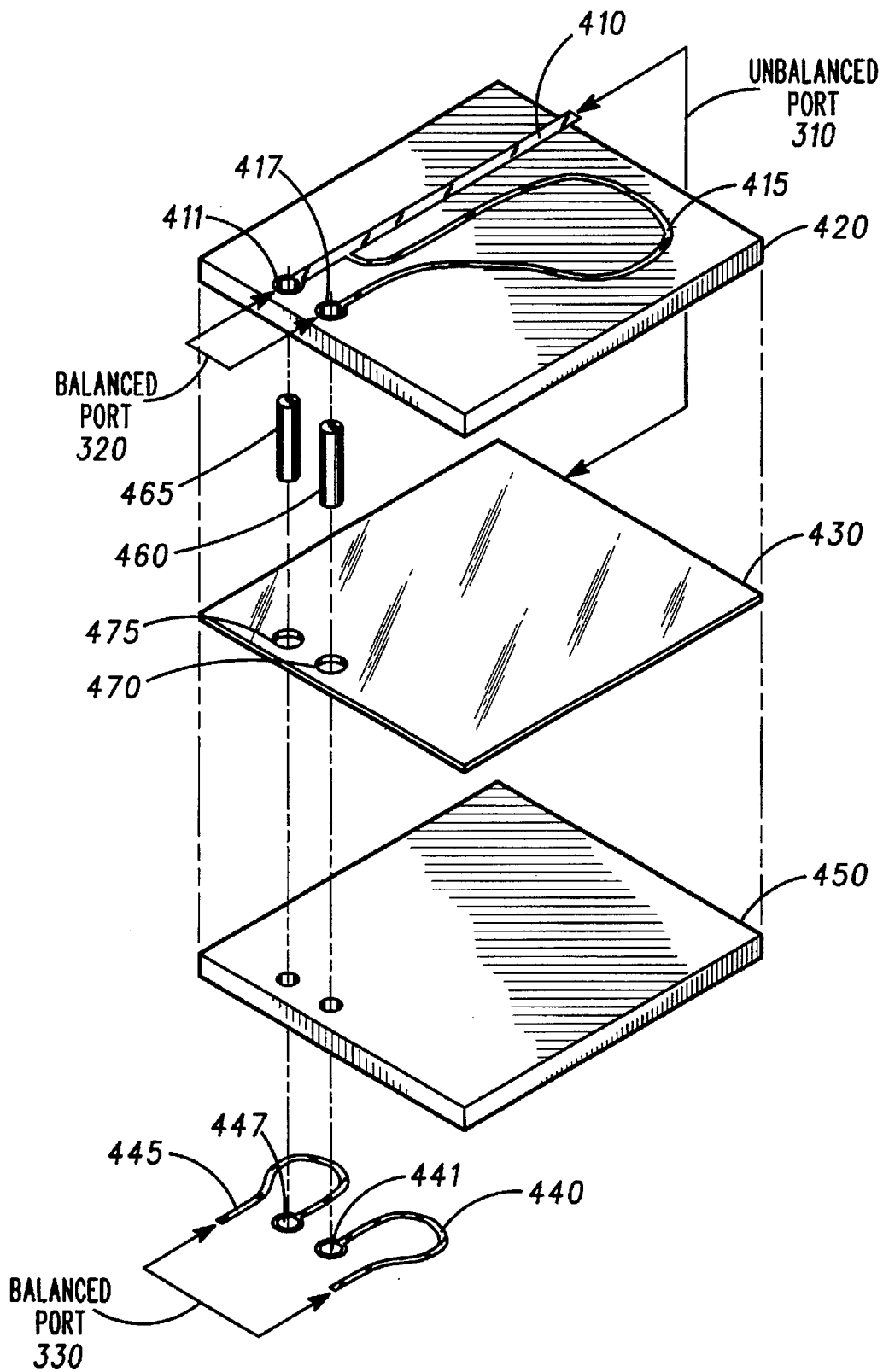
FIG. 3 illustrates an exploded perspective view of a microstrip implementation according to a second embodiment of the transformation network.

FIG. 3 illustrates an exploded perspective view of a microstrip implementation according to a second embodiment of the transformation network. The microstrip construction of FIG. 3 is provided by thin metallic strips 410 and 415 on a dielectric layer 420, a ground plane 430, and thin metallic strips 440 and 445 on a dielectric layer 450. Vias 460 and 465 connect thin metallic strips 415 and 410 to respective thin metallic strips 440 and 445. The vias 460 and 465 are isolated from the ground plane 430 by large through holes 470 and 475. Via 460 thus electrically connects end point 417 of the thin metallic strip 415 to end point 441 of the thin metallic strip 440. Likewise, via 465 connects end point 411 of the thin metallic strip 410 to end point 447 of the thin metallic strip 445. When metallic strips 440 and 445 have an electrical length equal to one-quarter wavelength at an operating frequency of interest, a 90° phase shifted balanced port 330 is formed at the ends of thin metallic strips 440 and 445 opposite the connection points 441 and 447. Another 0° phase shifted balanced port 320 is formed at the ends of thin metallic strips 410 and 415 at respective connection points 411 and 417. An unbalanced port 310 is formed at an opposing end of thin metallic strip 410 and a corresponding portion of the ground plane 430.

Thin metallic strips 410 and 415 formed on the dielectric 420 with the ground plane 430 thereunder form a microstrip transmission line between thin metallic strip 410 and the ground plane 430 and form a half-wavelength transmission line by the thin metallic strip 415 and the ground plane 430. Thin metallic strip 415 is switchback shaped to bring the connection point 417 into proximity with connection point 411 while still maintaining a half-wave transmission line characteristic. The half-wavelength transmission line serves as a half-wave balun or choke having the additional node of the ground plane 430. This additional node of the ground plane forms the outer or ground conductor for the phase shift transmission lines 440 and 445. The microstrip construction of FIG. 3 conveniently provides a balanced-unbalanced conversion network and a phase shift network in the same compact construction.

Figure 4:
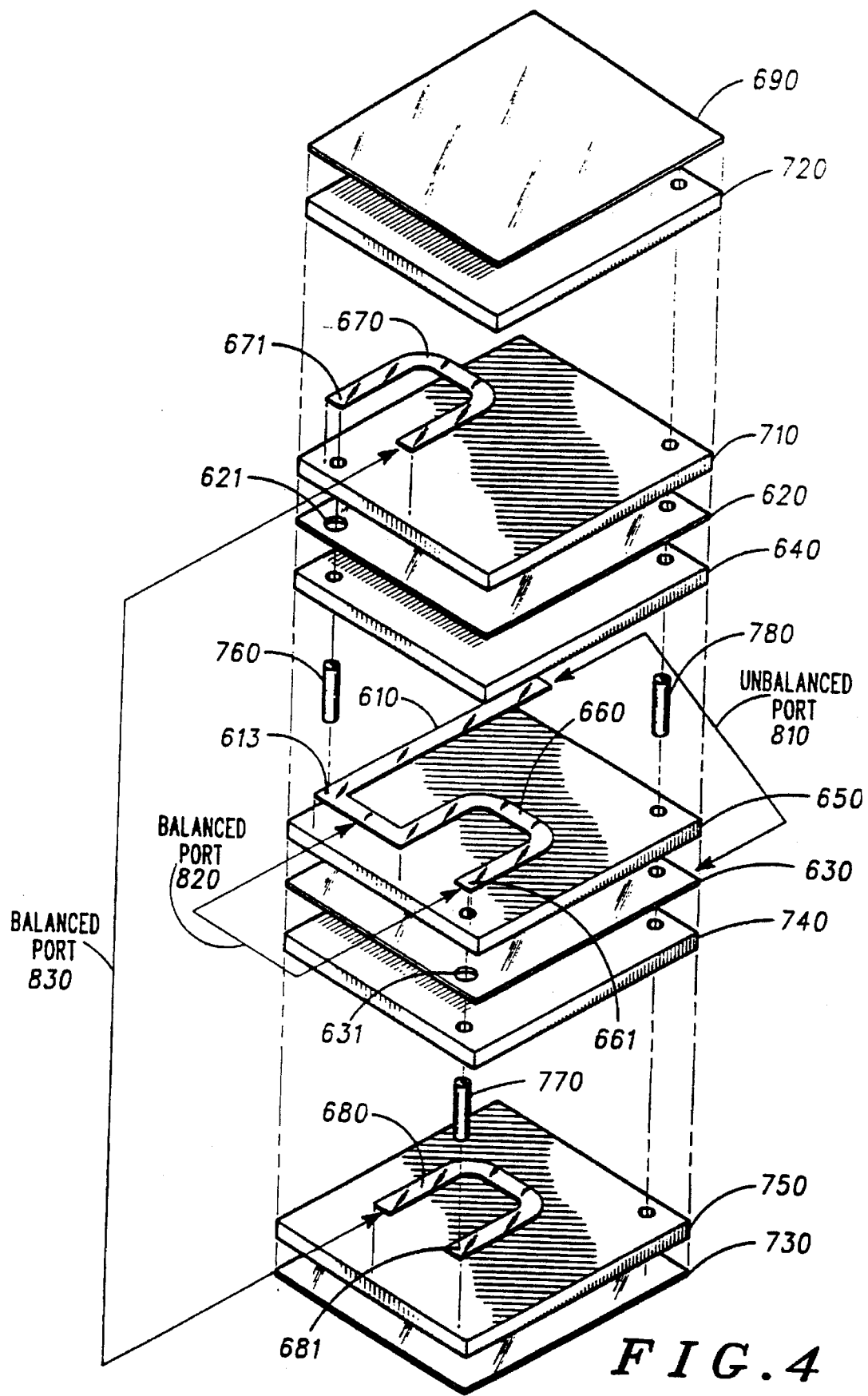
FIG. 4 illustrates an exploded perspective view of a stripline implementation according to a third embodiment of the transformation network.

FIG. 4 illustrates an exploded perspective view of a stripline construction according to a third embodiment of the transmission network. An unbalanced feed line transmission line is formed by a thin metallic strip 610 sandwiched between ground planes 620 and 630 by dielectric layers 640 and 650. A thin metallic strip 660 forms a half-wavelength transmission line when also sandwiched between the same ground planes 620 and 630 and dielectric layers 640 and 650. The half-wave transmission line can be any odd multiple of one-half wavelength (½, ⅜, ⅝, etc.) to form a half-wave balun. Thin metallic strips 670 and 680 form phase shift transmission lines when sandwiched between their respective ground planes. Thin metallic strip 670 is sandwiched between ground planes 620 and 690 by dielectrics 710 and 720. Likewise, thin metallic strip 680 is sandwiched between ground plane 630 and 730 and dielectric layers 740 and 750. Thin metallic strip 610 is connected by a via 760 at a connection point 613 to thin metallic strip 670 at a connection point 671. An outside end of thin metallic strip 660 is likewise connected by a via 770 at a connection point 661 to an end of the thin metallic strip 680 at a connection point 681. Through holes 621 and 631 are provided in respective ground planes 620 and 630 for vias 760 and 770 to pass therethrough without electrical connection to the ground planes 620 and 630.

Thin metallic strips 670 and 680 form quarter-wave phase shift transmission lines at the operating frequency of interest. As illustrated in FIG. 4, a 90° phase shift balanced port 830 is thus formed at ends of the phase shift transmission lines formed by the thin metallic strips 670 and 680 at the ends opposite the respective connection point 671 and 681. A 0° phase shift balanced port 820 is provided between the connection point 613 of the unbalanced feed line of the metallic strip 610 and connection 661 of the half-wave transmission lines of the thin metallic strip 660. An unbalanced port 810 is provided between an opposing end of the unbalanced feed line of the thin metallic strip 610 and a corresponding proximate portion of either one of the ground planes 630 or 620 as illustrated in FIG. 4.

Each of the ground planes 620, 630, 690 and 730 are electrically connected together by a plurality of vias, such as the illustrated via 780, to maintain equal potentials throughout the ground planes. The vias, such as via 780 illustrated in FIG. 4, should be placed throughout the stripline structure.

Figure 5:
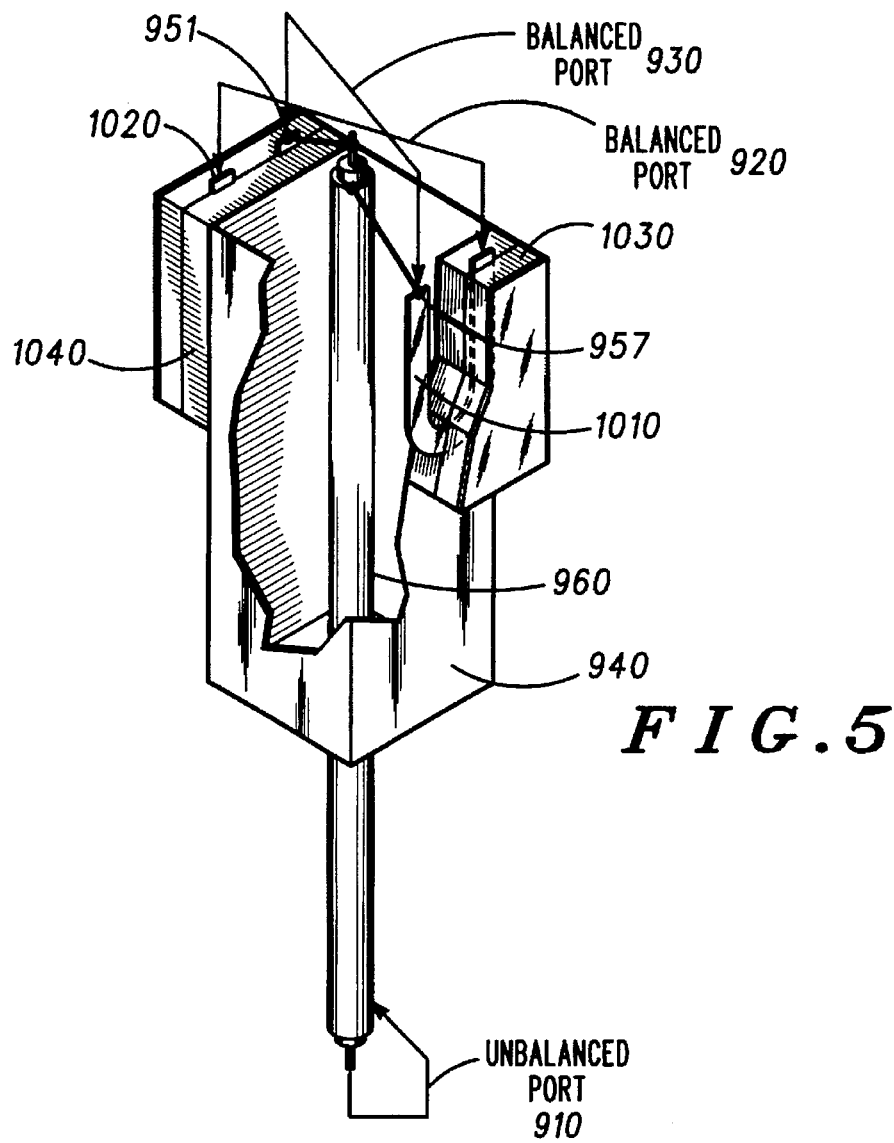
FIGS. 5 and 6 illustrate a hybrid implementation according to a fourth embodiment of the transformation network.
Figure 6:
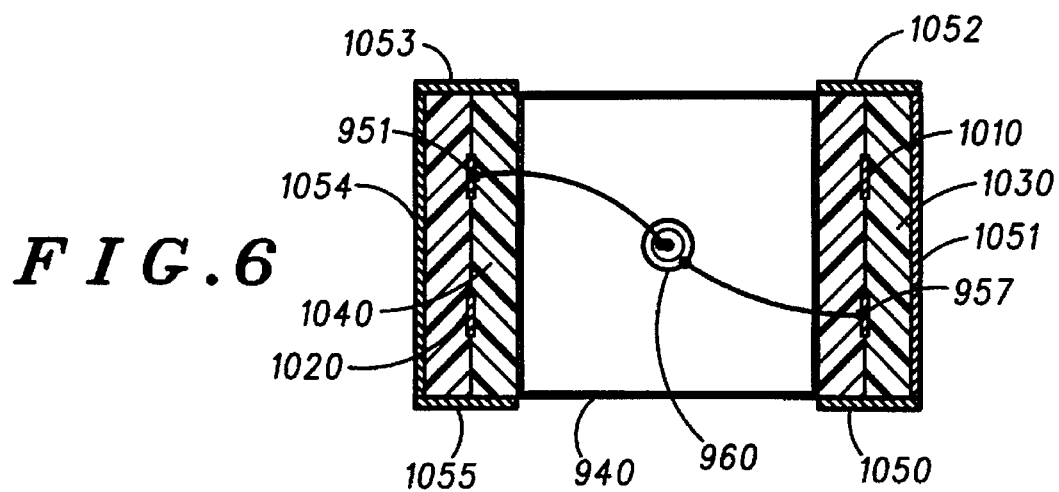

FIG. 5 illustrates a perspective and cutaway view of a hybrid construction according to a fourth embodiment of the transformation network. FIG. 6 illustrates a top view of the hybrid construction of the transformation network of FIG. 5. An air-filled rectangular metal box closed on a bottom end and open on a top end coaxially surrounds the unbalanced feed line 960. This rectangular metal box 940 preferably has a length equal to one-quarter the wavelength of a frequency of interest. The metal box configured coaxially with the coaxial unbalanced feed line 960 provides a bazooka-type balun. The coaxial unbalanced feed line 960 connects an unbalanced port 910 to the transformation network.

U-shaped thin metallic strips 1010 and 1020 are disposed within respective dielectric material 1030 and 1040. The dielectric material 1030 and 1040 are affixed to opposing sides of the rectangular metal box 940. The U-shaped metallic strips 1010 and 1020 thus utilize the metal box 940 as their ground plane. The metal box thus conveniently serves the dual purpose of creating a stripline providing a ground plane for the U-shaped thin metallic strips 1010 and 1020 and providing the balun. Two phase shift transmission lines are thus formed by the U-shaped thin metallic strips 1010 and 1020 and the corresponding ground plane of the rectangular box 940. An outer conductor of the unbalanced feed line 960 connects at a top end to connection point 957 on the U-shaped thin metallic strip 1010. Likewise, an inner conductor at a top end of the unbalanced feed line 960 connects to connector point 951 of the U-shaped thin metallic strip 1020. A 0° phase shifted balanced port 930 is thus provided between the connection points 957 and 951. Because each of the U-shaped thin metallic strips 1010 and 1020 forms quarter-wave transmission line, a 90° phase shifted balanced port 920 is provided across opposite ends of the U-shaped thin metallic transmission lines 1010 and 1020.

Perimeter surfaces 1050, 1051 and 1052 of the dielectric 1030 should be metalized such that the U-shaped thin metallic member forms a stripline transmission line therebetween. Alternatively, if exterior surfaces 1050, 1051 and 1052 of the dielectric 1030 are not metalized, then a microstrip may be formed by the U-shaped thin metallic strip 1010. Outer surfaces 1053, 1054 and 1055 of the other dielectric material 1040 likewise should be metalized to form a stripline transmission line or otherwise a microstrip transmission line would be formed. Both of the stripline and microstrip transmission lines could be used; however, a stripline transmission line is more complex to implement than a microstrip transmission line. The stripline transmission line, however, is completely shielded which prevents undesired interactions between the phase shift lines and which better shields nearby RF components.

Figure 7:
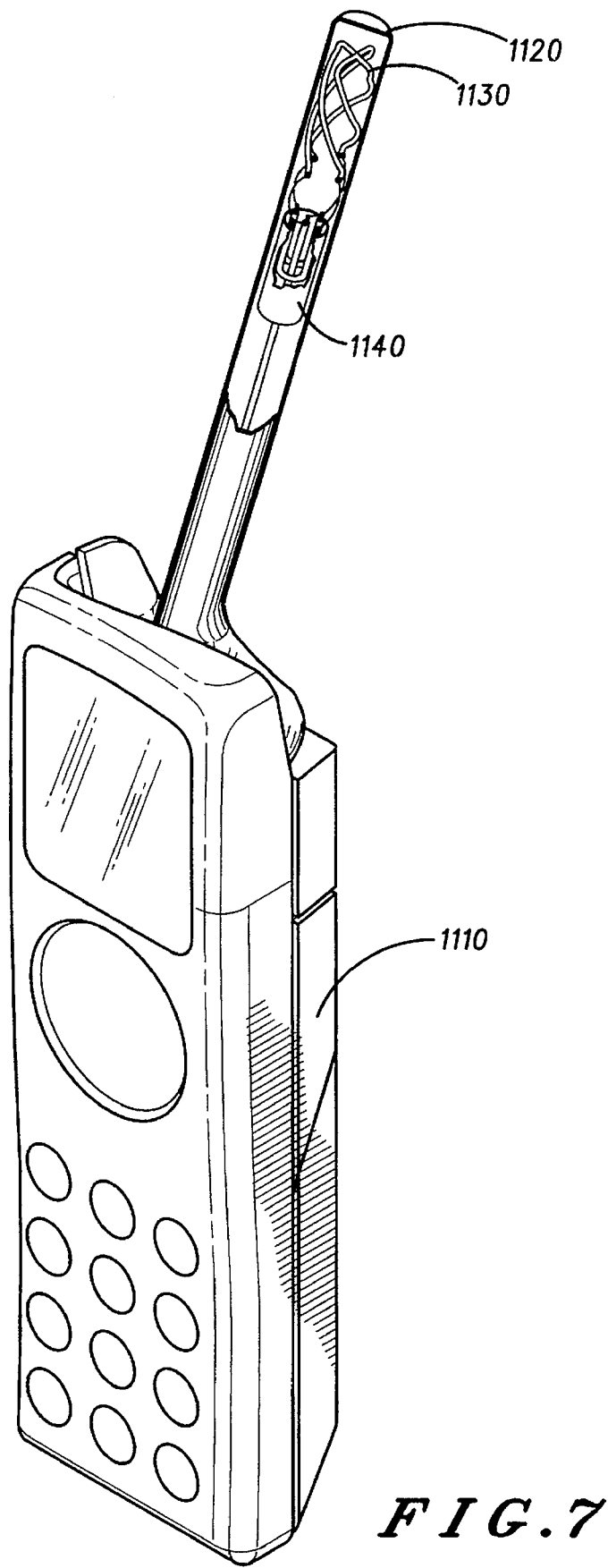
FIG. 7 illustrates a perspective view of a radio transceiver having a cutaway illustrating a transformation network feeding its antenna.

FIG. 7 illustrates a portable radiotelephone transmitter 1110 having an antenna assembly 1120 connected thereto at a pivot point. A crossed loop antenna element, such as a quadrifilar helix antenna (also known as a twisted cross loop antenna), is illustrated in a cutaway of the antenna assembly connected to the radiotelephone transmitter 1110 via the transformation network 1140. The radiotelephone transmitter 1110 connects to the unbalanced port of the transformation network 1140. Each of two balanced ports of the transformation network 1140 connect to a corresponding loop of the crossed loop antenna 1130.

Although the invention has been described and illustrated in the above description and drawings, it is understood that this description is by example only and that numerous changes and modifications can be made by those skilled in the art without departing from the true spirit and scope of the invention. The present invention is applicable to analog as well as digital voice, data or paging satellite systems. The present invention is also applicable to terrestrial antennas for portable radios requiring small antennas and uniform patterns. While the present invention has size advantages for a portable radio, the present invention also has advantages for fixed and mobile radios. Other devices requiring transformation between an unbalanced and multiple balanced and phase shifted ports such as various signal generators and signal analyzers or other like test equipment may also use the transformation network.

What is claimed is:

1. A passive multi-port radio frequency signal transformation network capable of interfacing between an unbalanced port and a plurality of differently phased balanced ports, comprising:

a balun comprising a first pair of nodes making up the unbalanced port, a balanced second pair of nodes and an additional node; and first and second unbalanced phase shift transmission lines, each of the first and second unbalanced phase shift transmission lines defined by a signal conductor and a ground conductor, wherein the signal conductor of the first unbalanced phase shift transmission line is operatively connected at a first end to one of the second pair of nodes of the balun, wherein the signal conductor of the second unbalanced phase shift transmission line is operatively connected at a first end to another of the second pair of nodes of the balun, wherein the ground conductors of the first and second unbalanced phase shift transmission lines are operatively connected to the additional node of the balun, wherein second ends of the signal conductors of the first and second unbalanced phase shift transmission lines form a first of the plurality of differently phased balanced ports and wherein the second pair of nodes of the balun form a second of the plurality of differently phased balanced ports.

2. A passive multi-port radio frequency signal transformation network according to claim 1, wherein both of the first and second unbalanced phase shift transmission lines have substantially equal electrical lengths sufficient to achieve a desired phase shift between two of the plurality of differently phases balanced ports.

3. A passive multi-port radio frequency signal transformation network according to claim 2, wherein the network transforms a signal at a frequency of interest; and wherein the electrical lengths of the first and second unbalanced phase shift transmission lines are one quarter-wavelength at the frequency of interest to provide a quadrature phase shift between two of the balanced ports.

4. A passive multi-port radio frequency signal transformation network according to claim 2, wherein both of the first and second unbalanced phase shift transmission lines have substantially equal characteristic impedances.

5. A passive multi-port radio frequency signal transformation network according to claim 1, wherein the first and second unbalanced phase shift transmission lines each comprise coaxial transmission lines having their ground conductors connected to each other and the additional node of the balun.

6. A passive multi-port radio frequency signal transformation network according to claim 5, wherein the balun comprises a quarter-wave choke.

7. A passive multi-port radio frequency signal transformation network according to claim 6, wherein the quarter-wave choke comprises an elongated conductive sleeve having a closed end near the unbalanced port and concentrically coaxial with an unbalanced feedline connected to the unbalanced port, the unbalanced feedline having a ground conductor connected to the elongated conductive sleeve at the closed end.

8. A passive multi-port radio frequency signal transformation network according to claim 7, wherein the coaxial transmission lines are disposed on a surface of the elongated conductive sleeve.

9. A passive multi-port radio frequency signal transformation network according to claim 1, wherein the first and second unbalanced phase shift transmission lines comprise thin metallic strips and at least one corresponding ground plane connected to the additional node of the balun.

10. A passive multi-port radio frequency signal transformation network according to claim 9, wherein a dielectric is disposed on the balun between the balun and the thin metallic strips of the unbalanced phase shift transmission lines.

11. A passive multi-port radio frequency signal transformation network according to claim 10, wherein the thin metallic strips and the at least one corresponding ground plane form a microstrip transmission line.

12. A passive multi-port radio frequency signal transformation network according to claim 10, wherein the thin metallic strips and at least two corresponding ground planes form a stripline transmission line.

13. A passive multi-port radio frequency signal transformation network according to claim 10, wherein the balun comprises a quarter-wave choke.

14. A passive multi-port radio frequency signal transformation network according to claim 13, wherein the quarter-wave choke comprises an elongated conductive sleeve having a closed end near the unbalanced port and concentrically coaxial with an unbalanced feedline connected to the unbalanced port, the unbalanced feedline having a ground conductor connected to the elongated conductive sleeve at the closed end.

15. A passive multi-port radio frequency signal transformation network according to claim 14, wherein the thin metallic strips of the unbalanced phase shift transmission lines are laminated to the elongated conductive sleeve with the dielectric therebetween.

16. A passive multi-port radio frequency signal transformation network according to claim 15, wherein the elongated conductive sleeve forms at least one ground plane of the unbalanced phase shift transmission lines.

17. A passive multi-port radio frequency signal transformation network according to claim 10, wherein the balun comprises a switchback shaped transmission line with an electrical length of one-half wave, wherein the switchback shaped transmission line comprises a switchback shaped thin metallic strip and at least one corresponding ground plane, wherein one end of the switchback shaped thin metallic strip connects to the unbalanced port and provides one of the balanced second pair of nodes of the balun and the other end of the switchback shaped thin metallic strip provides another of the balanced second pair of nodes of the balun.

18. A passive multi-port radio frequency signal transformation network for transforming a signal at a frequency of interest between an unbalanced port and a plurality of differently phased balanced ports, comprising:

a bazooka balun comprising a first pair of nodes making up the unbalanced port, a balanced second pair of nodes and an additional node, wherein the second pair of nodes of the bazooka balun form a first of the plurality of differently phased balanced ports, wherein the bazooka balun comprises a quarter-wave choke comprising an elongated conductive sleeve having a closed end near the unbalanced port and concentrically coaxial with an unbalanced feedline connected to the unbalanced port, and wherein the unbalanced feedline has a ground conductor connected to the elongated conductive sleeve at the closed end; and first and second unbalanced thin metallic phase shift transmission lines, each of the first and second unbalanced thin metallic phase shift transmission lines defined by a thin metallic strips and at least one corresponding ground plane, wherein the thin metallic strip of the first unbalanced thin metallic phase shift transmission line is operatively connected at a first end to one of the second pair of nodes of the bazooka balun, wherein the thin metallic strip of the second unbalanced thin metallic phase shift transmission line is operatively connected at a first end to another of the second pair of nodes of the bazooka balun, wherein the at least one corresponding ground plane is operatively connected to the additional node of the bazooka balun, and wherein second ends of the thin metallic strips of the first and second unbalanced thin metallic phase shift transmission lines form a second of the plurality of differently phased balanced ports, wherein the first and second unbalanced thin metallic phase shift transmission lines have equal characteristic impedances and have electrical lengths of one-quarter wavelength at the frequency of interest to provide a quadrature phase shift between two of the differently phased balanced ports, wherein a dielectric is disposed on the bazooka balun between the bazooka balun and the thin metallic strips of the unbalanced thin metallic phase shift transmission lines, wherein the thin metallic strips of the unbalanced thin metallic phase shift transmission lines are laminated to the elongated conductive sleeve of the bazooka balun with the dielectric therebetween and wherein the elongated conductive sleeve forms at least one ground plane of the unbalanced phase shift transmission lines.

19. A portable radio, comprising:

radio transceiver circuitry for providing an unbalanced output;

a balun comprising a first pair of nodes connected to the unbalanced output of the radio transceiver circuitry and comprising a balanced second pair of nodes and an additional node, and wherein the second pair of nodes of the balun form a first of a plurality of differently phased balanced ports;

first and second unbalanced phase shift transmission lines, each of the first and second unbalanced phase shift transmission lines defined by a signal conductor and a ground conductor, wherein the signal conductor of the first unbalanced phase shift transmission line is operatively connected at a first end to one of the second pair of nodes of the balun, wherein the signal conductor of the second unbalanced phase shift transmission line is operatively connected at a first end to another of the second pair of nodes of the balun, wherein the ground conductors of the first and second unbalanced phase shift transmission lines are operatively connected to the additional node of the balun, and wherein second ends of the signal conductors of the first and second unbalanced phase shift transmission lines form a second of the plurality of differently phased balanced ports; and an antenna element having at least two balanced antenna ports, one of the balanced antenna ports of the antenna element connected to the first of the plurality of differently phased balanced ports of the first and second unbalanced phase shift transmission lines and wherein the other of the balanced ports of the antenna element is connected to the second of the plurality of differently phased balanced antenna ports of the first and second unbalanced phase shift transmission lines.

* * * * *